United States Patent
Hall et al.

(10) Patent No.: US 9,472,987 B1
(45) Date of Patent: Oct. 18, 2016

(54) INDUCTION MOTOR STATOR WINDINGS

(71) Applicant: Summit ESP, LLC, Tulsa, OK (US)

(72) Inventors: Clint Franklin Hall, Claremore, OK (US); Larry Parmeter, Broken Arrow, OK (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 14/451,199

(22) Filed: Aug. 4, 2014

Related U.S. Application Data

(60) Provisional application No. 61/862,326, filed on Aug. 5, 2013.

(51) Int. Cl.
| | |
|---|---|
| H02K 3/04 | (2006.01) |
| H02K 5/10 | (2006.01) |
| H02K 3/00 | (2006.01) |
| H02K 17/00 | (2006.01) |
| H02K 3/12 | (2006.01) |
| H02K 17/02 | (2006.01) |
| H01B 7/00 | (2006.01) |

(52) U.S. Cl.
CPC .............. *H02K 3/12* (2013.01); *H01B 7/0009* (2013.01); *H02K 17/02* (2013.01)

(58) Field of Classification Search
CPC .................................. H02K 3/04; H02K 3/34
USPC .................... 310/87, 198, 201, 208
See application file for complete search history.

(56) References Cited

U.S. PATENT DOCUMENTS

| | | | | |
|---|---|---|---|---|
| 3,417,593 A | * | 12/1968 | Lewis | .............................. 72/211 |
| 3,505,729 A | * | 4/1970 | Balke et al. | ..................... 29/596 |
| 3,842,192 A | | 10/1974 | Hilker et al. | |
| 4,515,993 A | | 5/1985 | MacKenzie | |
| 5,326,935 A | | 7/1994 | Yamaguchi et al. | |
| 5,362,925 A | | 11/1994 | Yamaguchi et al. | |
| 5,476,229 A | * | 12/1995 | Ishikawa | ........................ 242/174 |
| 5,861,578 A | | 1/1999 | Hake et al. | |
| 5,917,155 A | | 6/1999 | Hake et al. | |
| 6,056,995 A | | 5/2000 | Hake et al. | |
| 6,288,342 B1 | | 9/2001 | Ueoka et al. | |
| 6,319,604 B1 | | 11/2001 | Xu | |

(Continued)

FOREIGN PATENT DOCUMENTS

| | | |
|---|---|---|
| EP | 0040034 A1 | 11/1981 |
| JP | 2003317547 A * | 11/2003 |

(Continued)

OTHER PUBLICATIONS

Machine Translation KR20110064243 (2011) and JP2011239537 (2011).*

(Continued)

*Primary Examiner* — Jose Gonzalez Quinones
(74) *Attorney, Agent, or Firm* — Frederic Dorwalt, Lawyers; Penina Michlin Chiu

(57) ABSTRACT

Induction motor stator windings are described. An electric submersible pump apparatus comprises an induction motor rotatably coupled to a multi-stage centrifugal pump, the induction motor comprising a stator frame, the stator frame comprising a plurality of slots, and a squircle-shaped magnet wire windingly inserted into the plurality of slots, the magnet wire comprising a conductor comprising a squircular-shaped cross-sectional area, and an insulation layer coating an outer surface of the squircular-shaped conductor.

7 Claims, 6 Drawing Sheets

(56) References Cited

U.S. PATENT DOCUMENTS

| | | | |
|---|---|---|---|
| D670,286 S | 11/2012 | Akana et al. | |
| 8,569,628 B2 | 10/2013 | Abe et al. | |
| 2010/0101828 A1 | 4/2010 | Duarte Pena et al. | |
| 2010/0148623 A1* | 6/2010 | Liu .............................. | 310/215 |
| 2010/0181094 A1 | 7/2010 | Duarte Pena | |
| 2011/0050024 A1* | 3/2011 | Rose ............................ | 310/195 |
| 2013/0278117 A1 | 10/2013 | Parmeter et al. | |

FOREIGN PATENT DOCUMENTS

| | | | |
|---|---|---|---|
| JP | 2008193860 A | * | 8/2008 |
| JP | 2011239537 A | * | 11/2011 |
| KR | 20110064243 A | * | 6/2011 |

OTHER PUBLICATIONS

Wikipedia, "Squiricle," taken from http://en.wikipedia.org/wiki/Squircle, Aug. 27, 2014, 4 pages.

Weisstein, Eric W. "Squiricle," Wolfram MathWorld Website, taken from http://mathworld.wolfram.com/Squircle.html, Date Unknown, 2 pages.

Japanese Patent Office, Japan Platform for Patent Information, Machine Translation of Japanese Patent Application Publication 2003317547 A, 21 pages.

Japanese Patent Office, Japan Platform for Patent Information, Machine Translation of Japanese Patent Application Publication 2008193860 A, 23 pages.

* cited by examiner though embodiments are described in which features from specific embodiments are combined with features from other embodiments.

INDUCTION MOTOR STATOR WINDINGS

CROSS REFERENCE TO RELATED APPLICATIONS

This application claims the benefit of U.S. Provisional Application No. 61/862,326 to Hall et al., filed Aug. 5, 2013 and entitled "SYSTEM AND METHOD FOR OPTIMIZING SLOT FILL PERCENTAGE IN ELECTRIC MOTOR STATOR FRAMES," which is hereby incorporated by reference in its entirety.

BACKGROUND OF THE INVENTION

1. Field of the Invention

Embodiments of the invention described herein pertain to the field of electric motors. More particularly, but not by way of limitation, one or more embodiments of the invention enable induction motor stator windings.

2. Description of the Related Art

Electric motors convert electrical energy into mechanical energy to produce linear force or torque and are used in many applications requiring mechanical power, such as pumps, power tools, household appliances and ship propulsion units. In the case of an electric submersible pump (ESP), for example, a two-pole, three phase, squirrel cage induction motor is typically used to turn a centrifugal pump for purposes of lifting fluid to the surface of a well. These electric motors include a stationary component known as a stator, and a rotating component known as the motor shaft. In ESP applications, the stator is energized by a power source located at the well surface and connected to the stator with an electric cable. The electricity flowing through the stator windings causes a magnetic field, and the motor shaft rotates in response to the magnetic field created in the energized stator.

The stator windings are a composition of stator laminations, magnet wire and one or more types of insulating material. Thin steel laminations are pressed together inside the stator housing. These laminations contain a series of insulated slots that allow magnet wire to be strung from one end of the stator to the other in a pattern that, when energized, creates the magnetic field. The magnetic field produced by the stator windings is a function of the amount of steel laminations in the stator, the type of steel utilized in the manufacture of the laminations, the quality of the insulation on the slots and on the magnet wire, and the amount of conductive material in the magnet wire that is woven into the slots.

Typically, conventional magnet wire includes a conductive material, such as copper or aluminum, which conductor is surrounded by a layer of insulating material, such as a polyimide film or a thermoplastic with high dielectric capabilities. Magnet wire is conventionally round in cross section and is available in several different wire gauge sizes. The gauge size (or diameter of the wire), and the number of times that the wire passes through the lamination stack dictate how much conductive material in the magnet wire is included in the stator winding. The more conductive material included in the stator winding, the better the magnetic field.

FIG. 1 illustrates a cross section of a conventional stator slot that contains windings of conventional round magnet wire. As shown in FIG. 1, the conventional slot contains empty space that is not filled by insulation or the magnet wire. The "slot fill" refers to the amount of space in the lamination slots that are occupied by wire or insulating materials, and is usually expressed as a percentage of the available slot area. If the slot fill percentage is too low, the quantity of conductive material from magnet wire will be low. This may cause the magnetic field created by the motor to suffer, and the motor may not operate efficiently or fail to perform as desired. On the other hand, care must be taken not to wind the wire too tightly in the slots. Doing so can cause damage to the wire in the winding process.

Currently, induction motor stator windings are not optimized, since inserting a series of round wires into a slot leaves an excessive amount of empty space in the slot, at least a portion of which could otherwise be filled with conductive material. Therefore, there is a need for additional induction motor stator windings.

BRIEF SUMMARY OF THE INVENTION

One or more embodiments of the invention enable induction motor stator windings.

Electric motor stator windings are described. In combination with an electric submersible pump system of the type wherein an induction motor is provided to operate a multi-stage centrifugal pump so as to turn the centrifugal pump, wherein the induction motor includes a stator frame and at least one slot in the stator frame, the improvement of an illustrative embodiment comprises a squircle-shaped magnet wire windingly inserted into the at least one slot to create a winding configuration, the magnet wire comprising a conductor with approximately a squircular cross-sectional shape, and an insulation layer coating an outer surface of the conductor, wherein a slot fill percentage of the at least one slot in the stator frame containing the squircular-shaped magnet wire in the winding configuration is at least 10% greater than a slot fill percentage of the at least one slot containing a round wire of about the same diameter in the winding configuration.

An illustrative embodiment of a magnet wire for an induction motor comprises a squircle-shaped magnet wire, the magnet wire comprising a copper wire comprising a squircular cross-sectional area, and an insulative coating fixedly coupled to an outer surface of the copper wire, the insulative coating forming a squircular-shaped surface of the magnet wire. In some embodiments, the magnet wire is windingly wrapped into at least one slot in a stator frame to form a stator winding.

An illustrative embodiment of an electric submersible pump apparatus comprises an induction motor rotatably coupled to a multi-stage centrifugal pump, the induction motor comprising a stator frame, the stator frame comprising a plurality of slots, and a squircle-shaped magnet wire windingly inserted into the plurality of slots, the magnet wire comprising a conductor comprising a squircular-shaped cross-sectional area, and an insulation layer coating an outer surface of the squircular-shaped conductor.

The induction motor of the system of an illustrative embodiment may comprise a variety of types of motors known in the art for use as electric submersible motors. For example, a three phase "squirrel cage" induction motor well known in the art, as well as wound type motors. Both these and other motors suitable for use with an ESP assembly may benefit from the induction motor stator windings of illustrative embodiments.

In further embodiments, features from specific embodiments may be combined with features from other embodiments. For example, features from one embodiment may be combined with features from any of the other embodiments.

In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein.

Figure 1:
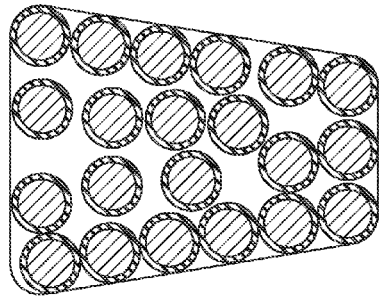
FIG. 1 is a stator slot containing conventional magnet wire windings of the prior art.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Induction motor stator windings will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a wire includes one or more wires.

As used in this specification and the appended claims, the cross section of a wire refers to a cross section taken at a right angle to the length of the wire.

As used in this specification and the appended claims, reference to a "shape" of a wire, means the cross-sectional shape unless the context clearly dictates otherwise.

There are two known, yet incompatible, mathematical definitions of a squircle. As used in this specification and the appended claims, a "squircle" or "squircular" shape means approximately a mathematical shape with properties between those of a square and those of circle characterized by the equation $x^4+y^4=r^4$, in a Cartesian coordinate system with the squircle centered at the origin of the x and y axis, where r is the radius of the squircle. In this definition, a squircle is a special case of a superellipse, with a=b (the semi-major and semi-minor axes are equal). The area of the squircle, as used herein, is defined by the equation:

$$A = \frac{8r^2 \Gamma\left(\frac{5}{4}\right)^2}{\sqrt{\pi}},$$

which may be approximated as: $A=3.70815r^2$.

As used herein, a "rectircle" is the rectangular counterpart to a squircle.

As used herein, a square has a comparably sized diameter to a circle when a length of a side of the square is equal to the diameter of the circle.

"Coupled" refers to either a direct connection or an indirect connection (e.g., at least one intervening connection) between one or more objects or components. The phrase "directly attached" means a direct connection between objects or components.

One or more embodiments of the invention provide induction motor stator windings for use in electric submersible pump (ESP) applications. While the invention is described in terms of an oil or gas pumping embodiment, nothing herein is intended to limit the invention to that embodiment.

Figure 4:
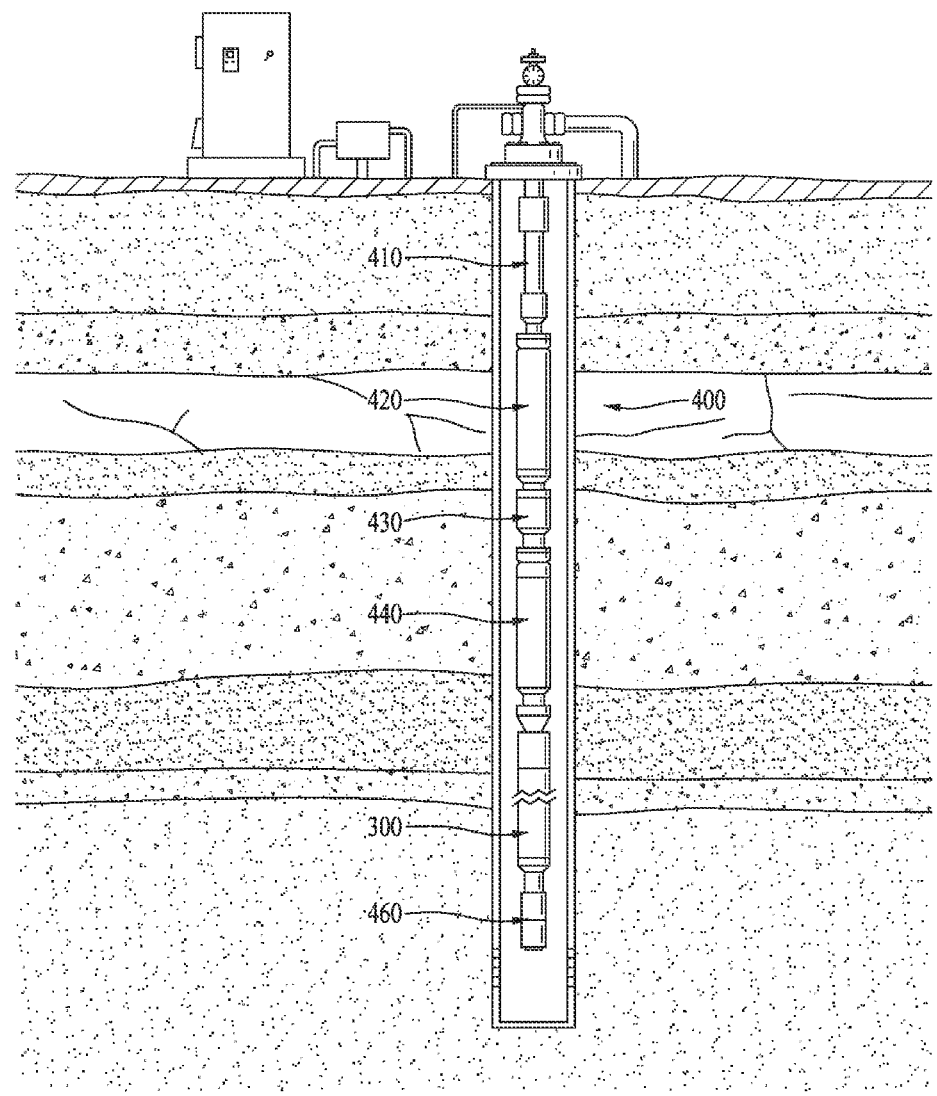
FIG. 4 is an elevation view of an exemplary electric submersible pump (ESP) assembly deployed underground, the ESP assembly comprising an induction motor including the magnet wire of an illustrative embodiment.

The system of the invention comprises an electric submersible pump (ESP) assembly. FIG. 4 illustrates an exemplary ESP assembly 400 arranged underground to pump gas or oil and making use of the induction motor stator windings of illustrative embodiments. As illustrated, ESP assembly 400 comprises a multistage centrifugal pump 420 to lift well fluid to the surface through production string 410. Fluid enters the centrifugal pump 420 through ESP intake 430, which intake 430 may be bolted-on or integral to the centrifugal pump 420. In order to function properly, electrical motor 300 must be protected from well fluid ingress, and seal section 440 provides a fluid barrier between the well fluid and motor oil. Motor oil resides within seal section 440, which is kept separated from the well fluid. In addition, seal section 440 supplies oil to electrical motor 300, provides pressure equalization to counteract expansion of motor oil in the well bore and carries the thrust of centrifugal pump 420. Downhole sensors 460 may allow an operator to monitor the operation of electrical motor 300, for example the temperature and/or speed of electrical motor 300 utilizing magnet wire 220. Casing sizes for the ESP assembly illustrated may range from about 4.5 inches to 9 inches outer diameter, though the invention is not limited to these exemplary embodiments. A power cable (not shown) may connect motor 300 to a power source near the surface of the well.

Figure 2B:
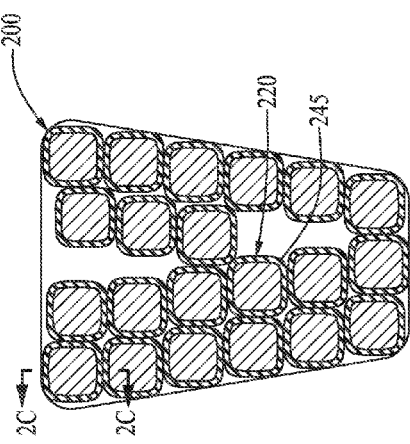
FIG. 2B shows an enlarged single slot of FIG. 2A comprising exemplary squircular magnet wire.
Figure 3:
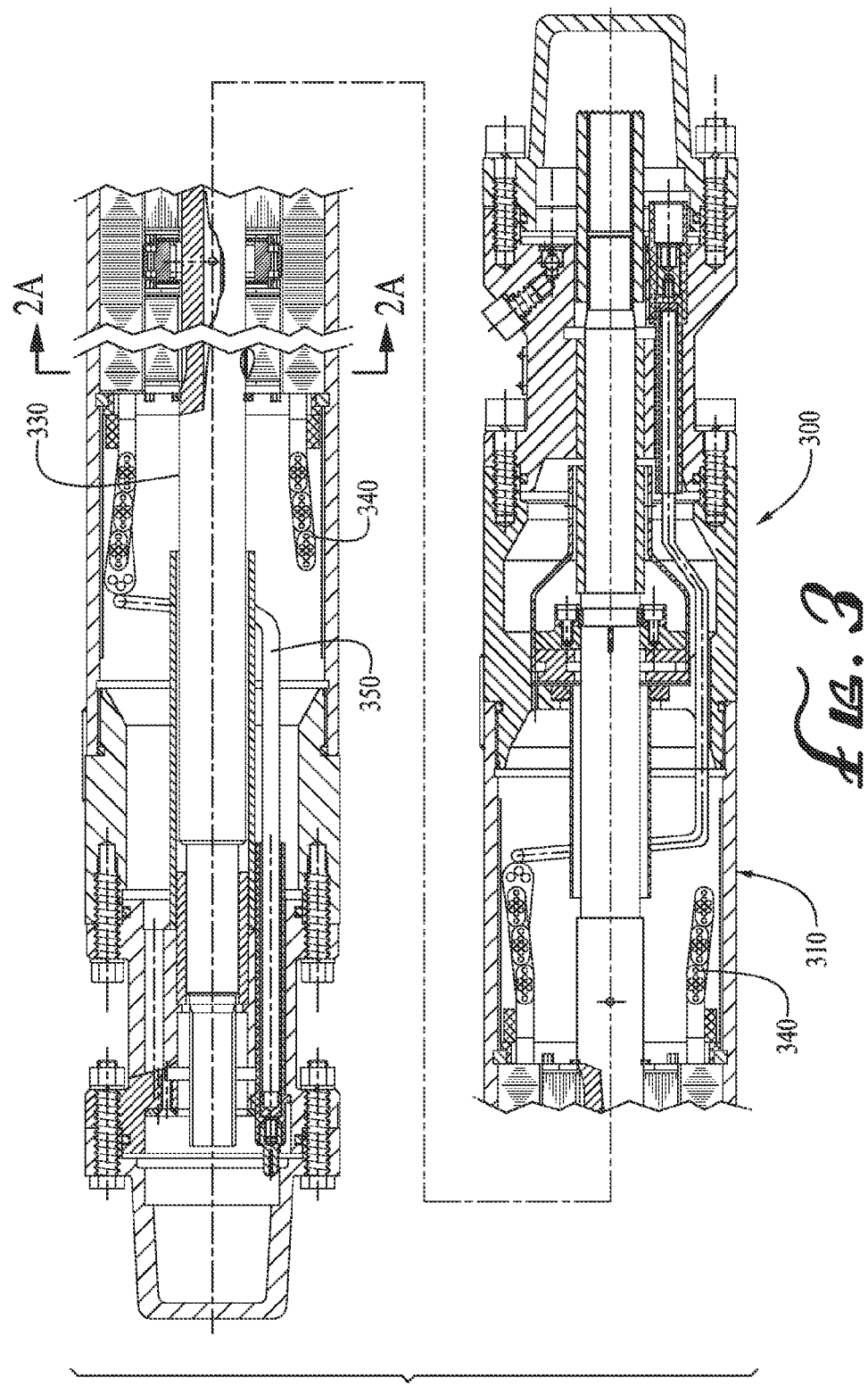
FIG. 3 illustrates an exemplary three-phase induction motor for use in one or more embodiments of the system of the invention.

The ESP system of an illustrative embodiment may comprise electrical motor 300. In some embodiments, electric motor 300 may be a three phase "squirrel cage" induction motor or a wound type motor used in the system of the invention to enhance the advantages of the stator windings of illustrative embodiments employing magnet wire 220 (shown in FIG. 2B). An illustrative embodiment of electric motor 300 is shown in FIG. 3. As shown in FIG. 3, electric motor 300 may include stator frame 310. Stator frame 310 may be comprised of steel laminations and include bore 330 to accommodate the rotating member (shaft) of motor 300. In some embodiments, magnet wire 220 may be hand-wound on motor 300 or the winding may be automated. Motor 300 of the system of illustrative embodiments may operate from 15 to 1,000 horsepower, though the invention is not limited to this example. End coils 340 and main lead wire 350 are also shown. Main lead wire 350 connects to a power cable for motor 300, to energize stator frame 310.

Figure 2A:
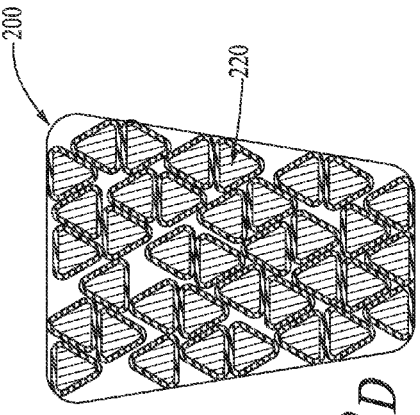
FIG. 2A illustrates a cross sectional view taken along line 2A-2A of FIG. 3 of an ESP motor containing a number of slots comprising the magnet wire of illustrative embodiments.
Figure 6A:
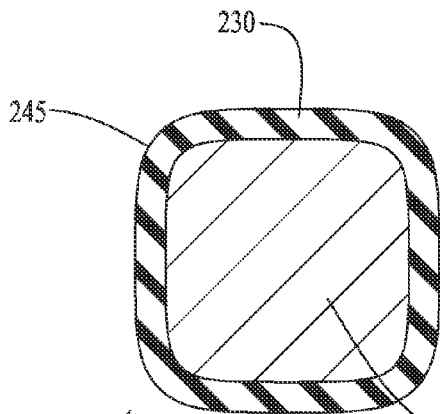
FIG. 6A is a cross sectional view of a squircular wire of an illustrative embodiment.
Figure 6B:
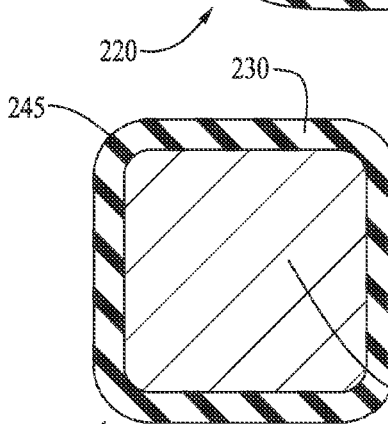
FIG. 6B is a cross sectional view of a squircular wire of the rounded square type of an illustrative embodiment.
Figure 6C:
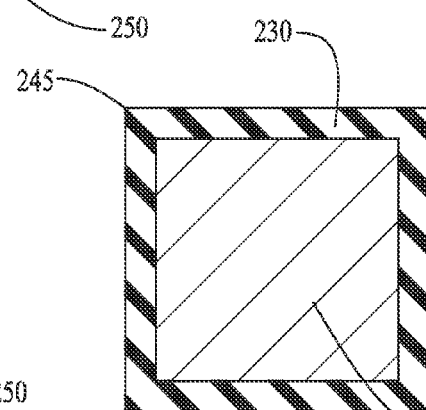
FIG. 6C is a cross sectional view of an illustrative embodiment of a square wire.
Figure 6D:
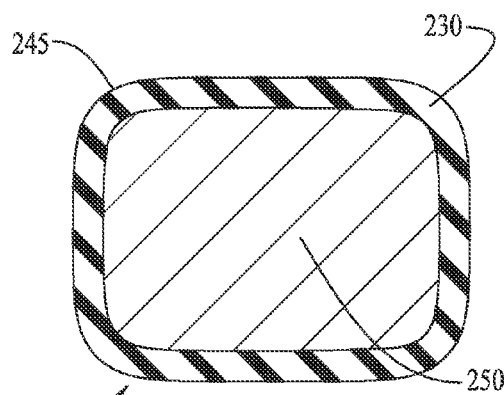
FIG. 6D is a cross sectional view of a rectircle wire of an illustrative embodiment.
Figure 6E:
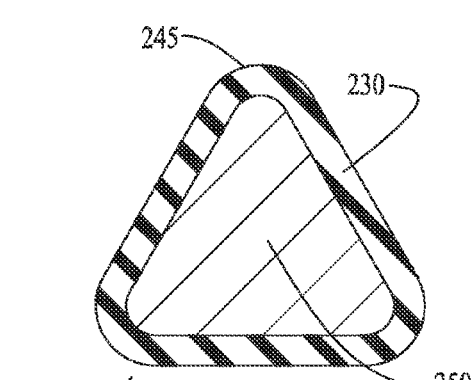
FIG. 6E is a cross sectional view of a triangular wire with rounded corners of an illustrative embodiment.

Stator frame 310 comprises a plurality of steel slots 200, as shown in FIG. 2A. Slots 200 may be insulated as is well known to those of skill in the art. Slots 200 include wire windings of one or more magnet wire 220 shown in FIGS. 2A-2C. As illustrated in FIG. 2B, the cross-sectional area of magnet wire 220 passed through slot 200 is squircular shaped. Squircular shaped magnet wire 220 is also illustrated in FIG. 6A. Squircular shaped magnet wire 220 of the rounded square type is illustrated in FIG. 6B. In other embodiments, magnet wire 220 wire may be square, as illustrated in FIG. 6C, rectircle shaped as illustrated in FIG. 6D, or equilateral triangle in shape with rounded corners, as illustrated in FIG. 2D and FIG. 6E. Magnet wire 220, as illustrated in FIGS. 6A-6E, is comprised of conductor 250 and insulation. In illustrative embodiments, conductor 250 may be shaped in the form of the selected shape (i.e., squircle, rectircle, square), and insulative layer 230 may take the shape of underlying conductor 250. In the example shown in FIGS. 2A-2C, conductor 250 is squircle shaped, and insulation layer 230 includes a squircle-shaped surface area that maintains the squircle shape of conductor 250 and/or magnet wire 220.

In some embodiments, for example squircle, rectircle, squircle of the rounded square type, or triangular, corner 245 of magnet wire 220 may be rounded. Rounding the corners of magnet wire 220 may reduce stresses on the wire insulation and reduce the overall profile of wire 220. A quadrilateral shape such as a square, or a triangle, may include sharp corners that may pierce or wear away magnet wire 220's insulation. Rounding corners 245 may reduce the sharpness of corner 245, protecting wire insulation 230 from damage. In addition, rounded corners 245 may protect wire insulation 230 from wear during the winding process. Rounded corners 245 may provide just enough space to avoid damage to magnet wire 220 whilst still increasing slot fill as compared to a round wire.

Figure 2C:
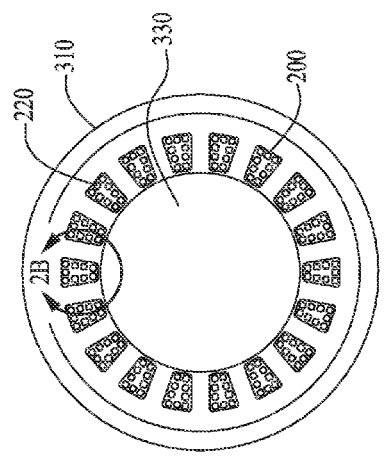
FIG. 2C shows a cross sectional view taken along line 2C-2C of FIG. 2B illustrating an exemplary magnet wire.
Figure 2D:
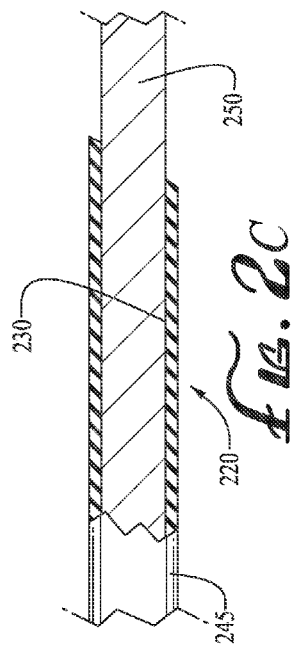
FIG. 2D illustrates a single slot comprising exemplary triangular magnet wire.

FIG. 2C shows a cross section across line 2C-2C of FIG. 2B of magnet wire 220. As shown in FIGS. 2B and 2C, conductor 250 is squircle shaped and encased in insulation 230. In some embodiments, conductor 250 may be copper or aluminum, for example copper wire or aluminum wire. Insulation 230 may be polyimide tape, extruded polymer thermoplastic, other wire insulation well known to those of skill in the art, or a combination of one or more layers of any of the foregoing. FIGS. 6A-6E show additional embodiments of magnet wire 220 with conductor 250 and insulation 230.

Magnet wire 220 of illustrative embodiments substantially increases the slot fill percentage of electric induction motor 300, as compared to the slot fill percentage of a motor having identical slots, and the same number of turns per slot, but making use of a conventional round wire. The increase in slot fill percentage may be illustrated with the following conceptual example:

The slot fill of slot 200, expressed as a percentage, may be represented with the formula:

$$SF = \frac{A \times N}{S} \times 100;$$

where SF is the slot fill percentage, A is the cross sectional area of the wire, N is the of number of turns in slot 200, and S is the area of slot 200. Thus, if one were to take a slot including turns of a conventional round wire, the slot fill percentage of such a slot may be expressed as:

$$SF_{Round} = \frac{\frac{\pi d^2}{4} \times N}{S} \times 100;$$

where SF is the slot fill percentage, d is the diameter of the wire, N is the number of turns in the slot and S is the area of slot 200.

If one were to take slot 200, including turns of magnet wire 220 where magnet wire 220 is a square, the slot fill percentage of such a slot may be expressed as:

$$SF_{Square} = \frac{d^2 \times N}{S} \times 100;$$

where SF is the slot fill percentage, d is the length of a side of square magnet wire 220, N is the number of turns in the slot and S is the area of slot 200.

Thus for a given slot area, and a number of turns, N, and where the diameter of a round wire is the same as the length of a side of a square magnet wire 220, the percentage increase in slot fill by moving from a conventional round wire to square magnet wire 220 of comparable diameter may be expressed as:

$$\left(\frac{SF_{Square}}{SF_{Round}} - 1\right) \times 100 = 27.32\%$$

The calculation for percent increase in slot fill by moving from a circle to a squircle may be approximated in much the same way. The cross sectional area, A, of a squircular wire may be approximated as:

$A = 3.70815\ r^2$, while that of a circle is $A = \pi r^2$. As 3.70815 is greater than it (approximately 3.14159.), the cross-sectional area of a squircle of radius r is greater than the cross-sectional area of a circle of radius r by approximately 18%. Thus, the percentage increase in slot fill by moving from a conventional round wire to a squircular wire of same diameter is about 18%.

An increase in slot fill percentage translates into a greater amount of space in the slot being filled by conductive wire as opposed to empty space. Thus, as illustrated by the previous example, the use of the same number of turns in a stator slot configuration, such as the slot configuration of slot 200 illustrated in FIG. 2B, when square, squircular, squircular of the rounded square type, or rectircle magnet wire 220 of comparable diameter is utilized, increases the amount of conductor 250 (e.g., copper or aluminum) in a given slot 200 where round wire has conventionally been utilized. This additional amount of conductor 250 can substantially improve the performance of stator frame 310 by improving the ratio of conductor 250 to steel in stator frame 310; the steel creating the magnet field that is responsible for the rotational force of electric motor 300 once stator frame 310 is energized. More conductor 250 in slot 200 may achieve the same horsepower with a shorter stator frame 310 or make the same stator frame 310 have higher horsepower.

In the illustrated example, the increase in slot fill percentage is about 25% for a square wire and 18% for a squircle wire, although not all of the increase is attributable to additional conductor 250, since wire insulation 230 also takes up space in slot 200. Other increases in slot fill percentage are also contemplated depending upon the shape of a cross section of magnet wire 220, which may be square, squircle, squircle of the rounded corner type, rectangular, rectircle, trapezoidal, a parallelogram, triangular or other four-sided or poly-sided shape (for example a pentagon or octagon), and which may have rounded corners 245. In triangular embodiments, the triangle may be equilateral, isosceles or scalene type. In some embodiments, the increase in slot fill percentage may be between about 10% and about 20%.

The previously discussed examples of slot fill percentage have assumed that in replacing a traditional round wire with differently shaped magnet wire 220 of comparable diameter, the number of turns in slot 200 remains constant. However, depending upon the selected shape of magnet wire 220, and the type of winding method employed, the number of turns in slot 200 may also be increased due to the more efficient nesting of magnet wire 220 in slot 200 with respect to adjacent magnet wires 220. For example, as shown in FIG. 2D, triangular magnet wire 220 may be wound in slot 200 with less empty space in between adjacent magnet wires 220 than with round wire. Additional turns in slot 200 may also contribute to increasing slot fill percentage by increasing the amount of conductor 250 in slot 200. This increase may come at the expense of higher resistance due to the longer length of the wire—although in many embodiments the gain in efficiency from additional conductor material may outweigh any losses due to resistance.

In other embodiments, slot fill percentage may be increased despite a reduction in the number of turns per slot 200, due to the substantial gain in cross-sectional area of conductive material in slot 200, while also reducing the resistance, because the wire has greater cross sectional area and so can carry more current, and yet is shorter due to the ability to use a reduced number of turns. These benefits are achieved through the use of magnet wire 220 of illustrative embodiments in place of traditional round wire.

Figure 7:
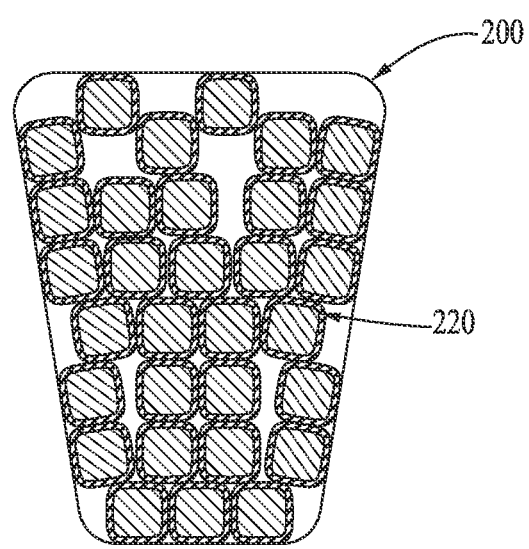
FIG. 7 illustrates a single slot comprising exemplary squircular wire of an illustrative embodiment.

In yet another example, squircular magnet wire 220 may be used in place of traditional circular wire in slot 200. However, instead of keeping the diameter of squircular magnet wire 220 the same as traditional circular wire for the replacement, the cross sectional areas may be maintained for the replacement. In such an instance, more turns of squircular magnet wire 220 may fit in slot 200 due to differences in nesting of the squircular shape. Such an example is illustrated in FIG. 7. As shown in FIG. 7, thirty-one turns of squircular magnet wire 220 fit into slot 200, where only about twenty-one turns of conventional round magnet wire of the same cross-sectional area would fit. Such an arrangement may be beneficial, for example in high temperature applications to combat wire insulation decay. In this example, there may be as much as a 40% gain in conductor 250 cross-sectional area in slot 200.

The run life of an ESP system may be directly related to the quality and reliability of the power cable. Power cables for the system of the invention may be round or flat and configured to function in temperatures ranging from around −60° F. to about 450° F. Power cables of the system should provide extreme durability and reliability in conditions including resistance to decompression and fatigue with corrosion-resistant barriers that resist fluids and gas. Cables manufactured to ISO 9001 standards may be preferred in one or more embodiments of the invention.

Figure 5:
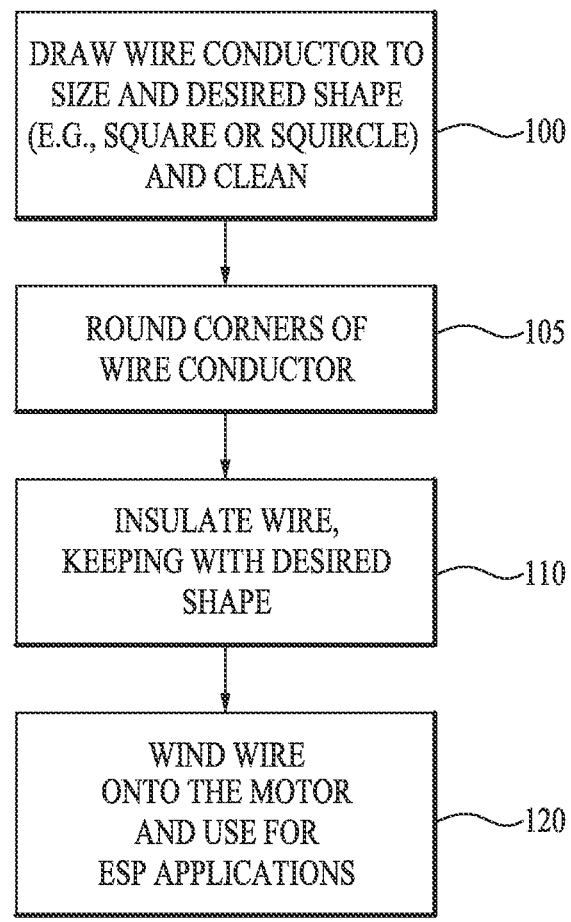
FIG. 5 is a flowchart illustrating an exemplary method of optimizing the slot fill percentage in induction motor stator windings.

FIG. 5 illustrates one or more methods of making magnet wire 220 for use in stator frame 310 of motor 300 of an ESP assembly. At step 100, conductor 250 may be drawn to size and the selected shape (e.g., a squircle or square), annealed and cleaned using methods known in the art. In some embodiments, the corners of the shaped conductor 250 may be separately rounded at step 105, for example in the instance the rounding has not previously been completed during step 100.

In one example, if a squircle-shaped wire is selected, conductor 250 may be drawn in the shape of a square at step 100. In such an example, at step 105, the corners of conductor 250 may be rounded to create a squircle-shape conductor 250. Rounding the corners may be accomplished by pulling conductor 250 through a series of progressively smaller dies until the desired rounded-corner shape has been reached. In instances where the corners are rounded at step 100 and/or in instances where a square shape has been selected, for example, step 105 may not be necessary. In another example, conductor 250 may be drawn to a squircle shape at step 100 and step 105 is not necessary.

At step 110, conductor 250 may insulated. In some embodiments, conductor 250 may be pulled through a polyimide film (tape) wrap machine to wrap conductor 250 with insulation 230. The polyimide tape may contain adhesive on its surface or the adhesive may be separately applied. This adhesive makes contact with the conductor 250 and may be heat activated, providing a bond to the wire. Using such a method, insulation 230 would take the quadrilateral or triangular shape of conductor 250. One type of polyimide tape that may be used is poly(4,4'-oxydiphenylene-pyromellitimide), also known as Kapton®. Various types of polyimide tape may be suitable, such as Kapton® tape types FN, HN and HPP-ST, for example. Other polyimide tapes having similar chemical properties may also be used. In some embodiments, conductor 250 may be drawn through an extrusion mold (die) to apply an organic polymer thermoplastic, such as molten PEEK (polyetheretherketone) as insulation 230. Other organic polymers thermoplastics having similar chemical properties as PEEK may also be employed. In embodiments where insulation 230 is PEEK, the PEEK die forces the molten organic polymer thermoplastic around the conductor 250, also maintaining the selected quadrilateral or triangular shape. In certain embodiments, multiple layers of insulation 230 may be used, such as a layer of polyimide film surrounded by a layer of PEEK to form magnet wire 220 in a squircle, square, rectircle, square with rounded corners or other shape as described herein.

At step 120, magnet wire 220 may now be wound onto motor 300 in a conventional fashion and used for ESP applications. In preferred embodiments, needle winding may be employed to prevent twist, undulation and drift of magnet wire 220 during winding. Needle winding may also assist in preventing rub or friction defects in insulation 230. In other embodiments, machine random winding may be employed. In some embodiments, magnet wire 220 may be triangular in shape or triangular with rounded corners, as illustrated in FIG. 2D and FIG. 6E. A triangular wire or triangular wire with rounded corners may be less likely to bend during winding since triangular wire may withstand more downward force for the same cross sectional area as a round wire.

When combined into a system with a three-phase induction, wound type or other motor for ESP applications, the magnet wire of illustrative embodiments optimizes the slot fill percentage of stator frames and creates an improved system and method for oil or gas well production. Other motors suitable for ESP applications may also be used as part of the system of the invention.

While the invention herein disclosed has been described by means of specific embodiments and applications thereof, numerous modifications and variations could be made thereto by those skilled in the art without departing from the scope of the invention set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. In combination with an electric submersible pump system of the type wherein an induction motor is provided to operate a multi-stage centrifugal pump so as to turn the centrifugal pump, wherein the induction motor includes a stator frame and at least one slot in the stator frame, the stator windings improvement comprising:
    a squircle-shaped magnet wire windingly inserted into the at least one slot to create a winding configuration, the magnet wire comprising:
        a conductor with approximately a squircular cross-sectional shape; and
        an insulation layer coating an outer surface of the conductor, the insulation layer having a squircle-shaped surface area;
    wherein a slot fill percentage of the at least one slot in the stator frame containing the squircle-shaped magnet wire in the winding configuration is at least 10% greater than a slot fill percentage of the at least one slot containing a round wire of about the same diameter in the winding configuration.

2. The improvement to the electric submersible pump system of claim 1, wherein the slot fill percentage of the at least one slot containing the squircle-shaped wire is between about 80-85%.

3. The improvement to the electric submersible pump system of claim 1, wherein the slot fill percentage of the at least one slot containing the squircle-shaped magnet wire in the winding configuration is about 20% greater than the slot fill percentage of the at least one slot containing the round wire of the same diameter in the winding configuration.

4. The improvement to the electric submersible pump system of claim 1, wherein the conductor is copper.

5. The improvement to the electric submersible pump system of claim 1, wherein the conductor is aluminum.

6. A magnet wire for induction motor stator windings comprising:
    a squircle-shaped magnet wire, the magnet wire comprising:
        a copper wire comprising a squircular cross-sectional area; and
        an insulative coating fixedly coupled to an outer surface of the copper wire, the insulative coating forming a squircular-shaped surface of the magnet wire;
    wherein the magnet wire is windingly wrapped into at least one slot in a stator frame to form a stator winding, wherein the magnet wire is electromagnetically coupled to an induction motor by stator winding; and
    wherein the induction motor is rotatably coupled to an electric submersible pump.

7. An electric submersible pump apparatus comprising:
    an induction motor rotatably coupled to a multi-stage centrifugal pump;
    the induction motor comprising a stator frame;
    the stator frame comprising a plurality of slots; and
    a squircle-shaped magnet wire windingly inserted into the plurality of slots, the magnet wire comprising:
        a conductor comprising a squircular-shaped cross-sectional area; and
        an insulation layer coating an outer surface of the squircular-shaped conductor, the insulation layer forming a squircle-shaped surface of the magnet wire.

* * * * *